United States Patent
Kinney et al.

[11] Patent Number: 5,991,864
[45] Date of Patent: Nov. 23, 1999

[54] POWER CONNECTORS, ANTENNA CONNECTORS AND TELEPHONE LINE CONNECTORS FOR COMPUTER DEVICES UTILIZING RADIO AND MODEM CARDS

[75] Inventors: Patrick W. Kinney; Ronald L. Mahany, both of Cedar Rapids; John H. Mallard, Swisher, all of Iowa

[73] Assignee: Intermec IP Corp., Beverly HIlls, Calif.

[21] Appl. No.: 08/226,177

[22] Filed: Apr. 12, 1994

Related U.S. Application Data

[63] Continuation-in-part of application No. 08/181,564, Jan. 13, 1994, abandoned, which is a continuation-in-part of application No. 08/154,020, Nov. 17, 1993, abandoned, which is a continuation-in-part of application No. 08/107,470, Aug. 17, 1993, abandoned, which is a continuation-in-part of application No. 08/081,411, Jun. 22, 1993, abandoned, which is a continuation-in-part of application No. 08/053,901, Apr. 27, 1993, abandoned, and a continuation-in-part of application No. 08/097,462, Jul. 26, 1993, Pat. No. 5,590,346.

[51] Int. Cl.[6] .................................................. H04B 1/38
[52] U.S. Cl. ........................... 712/1; 455/575; 455/90
[58] Field of Search ............................ 395/800, 800.01; 235/375, 472; 455/103, 89, 90, 575; 712/1

[56] References Cited

U.S. PATENT DOCUMENTS

| | | | |
|---|---|---|---|
| 4,916,441 | 4/1990 | Gombrich | 340/712 |
| 5,175,878 | 12/1992 | Davis et al. | 455/103 |
| 5,331,136 | 7/1994 | Koenck et al. | 235/375 |
| 5,410,141 | 4/1995 | Koenck et al. | 235/472 |
| 5,628,055 | 5/1997 | Stein | 455/89 |

*Primary Examiner*—Meng-Ai T. An
*Assistant Examiner*—Walter D. Davis, Jr.
*Attorney, Agent, or Firm*—Akin,Gump,Strauss,Hauer & Feld, LLP

[57] ABSTRACT

A computer apparatus for receiving a removable communication card such as a radio card or a modem card. A radio or modem is self-contained inside a housing of the communication card and has an electrical interface for communicating information to and from the computer apparatus. The computer apparatus receives the communication card such that it engages the electrical interface. The computer apparatus additionally has at least one pair of electrical contacts which will encounter electrical contacts on the communication card. These contacts automatically connect the communication card to an appropriate antenna, telephone, telephone line or power source. A radio communication card is connected to the appropriate antenna for the type and frequency of the radio. A modem card is connected to a standard telephone line, a cellular phone, or an antenna for a cellular phone if the cellular phone is also disposed within the housing of the modem communication card. Additionally, a switching matrix can be used to connect one set of contacts on a radio card or a modem card to one or more of a plurality of antennas and telephone lines. Positioning two similar antennas in different position creates an antenna diversity scheme.

10 Claims, 6 Drawing Sheets

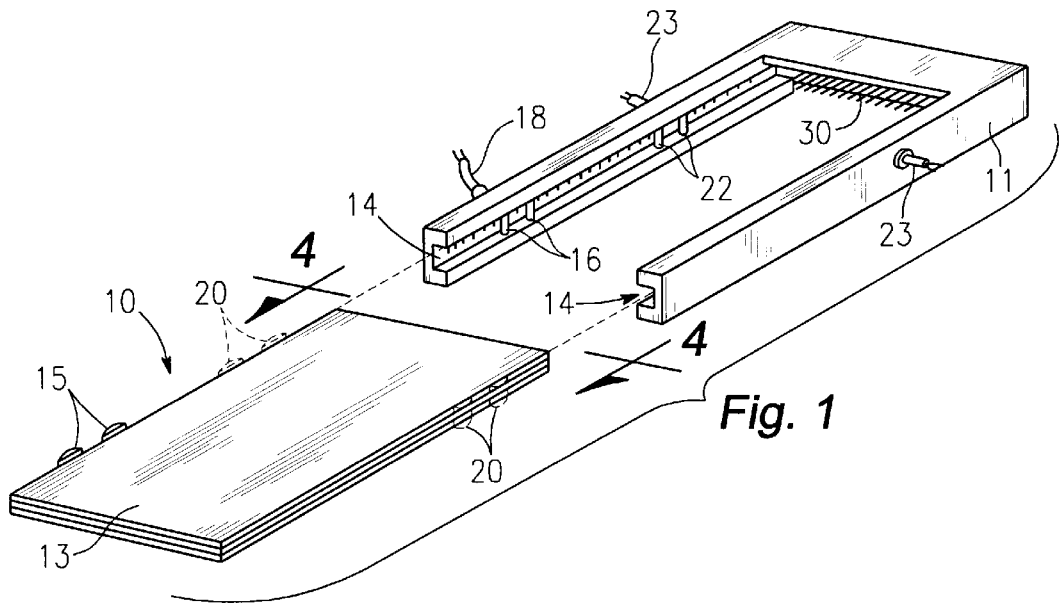
Fig. 1
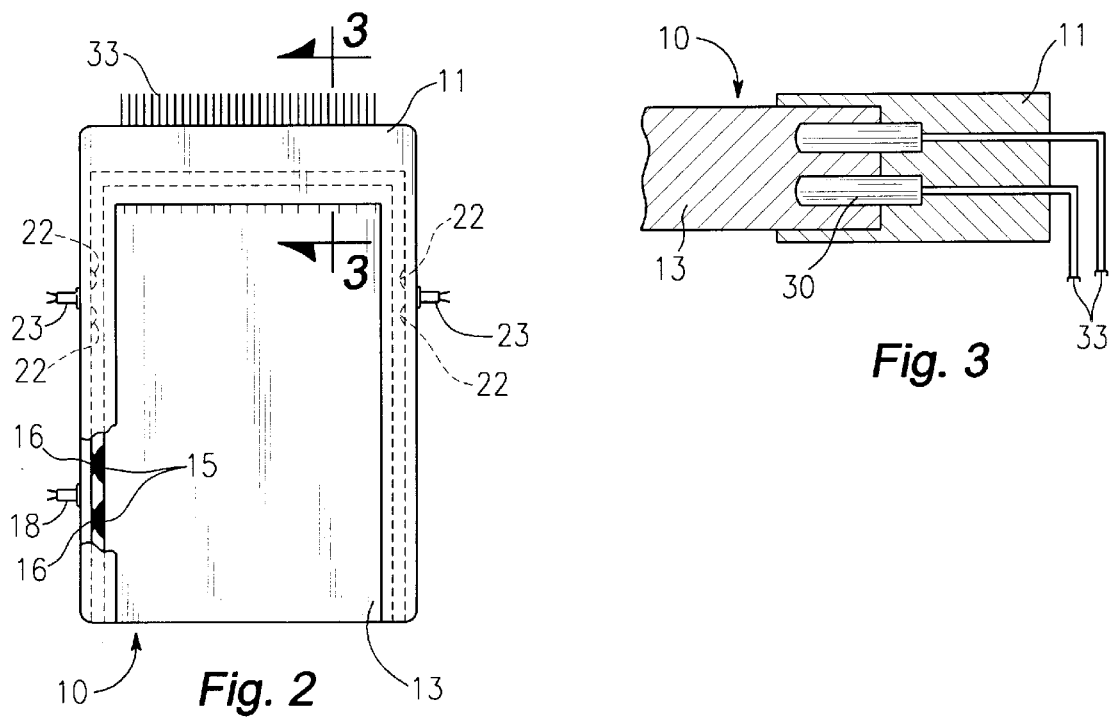
Fig. 2
Fig. 3
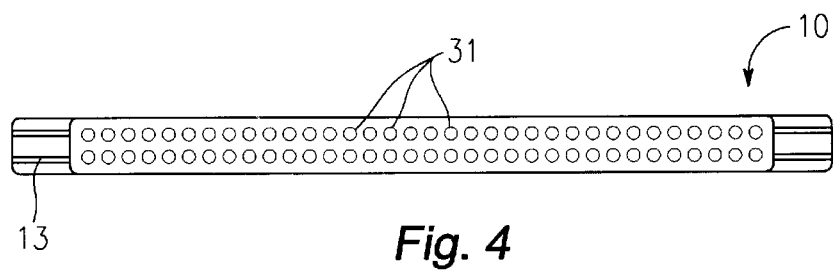
Fig. 4

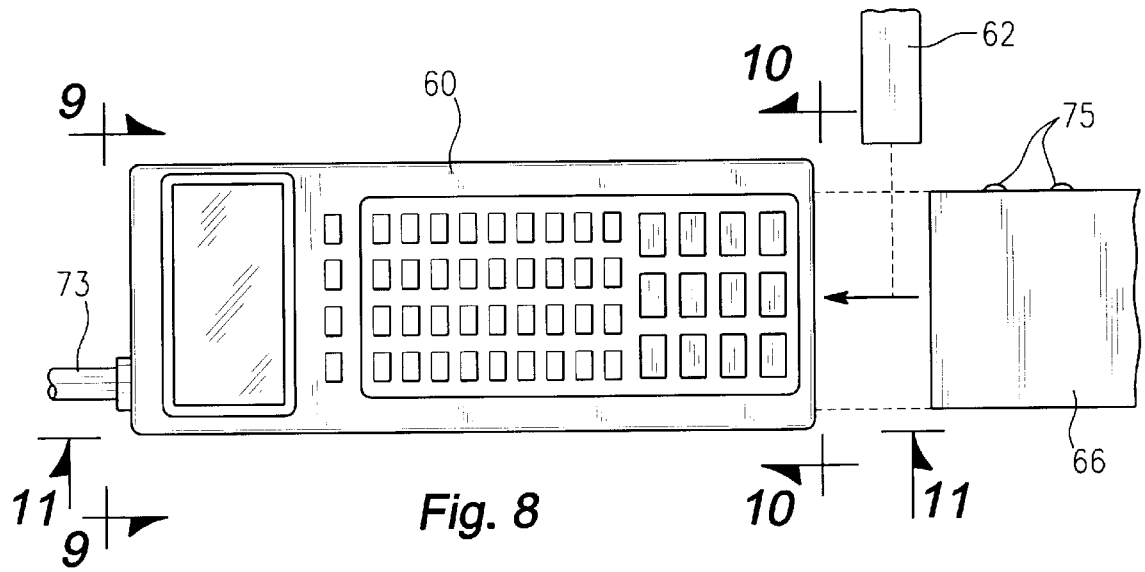
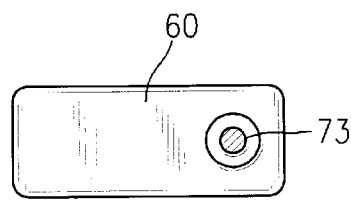
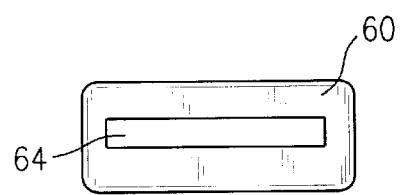
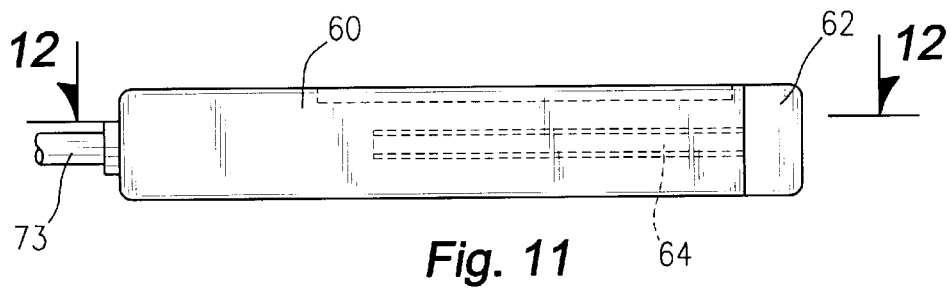
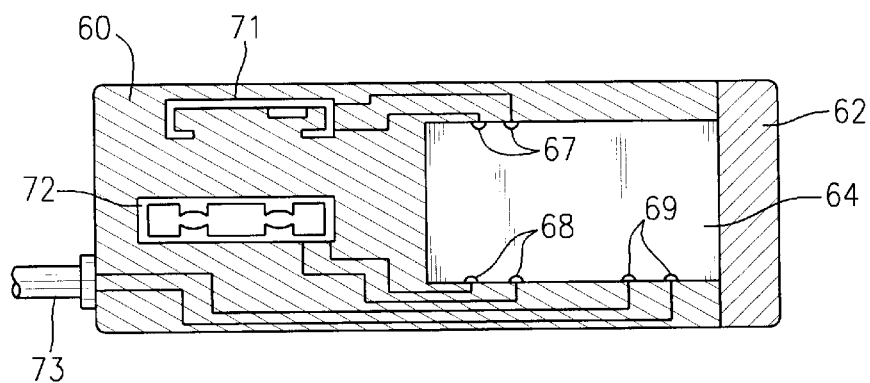

POWER CONNECTORS, ANTENNA CONNECTORS AND TELEPHONE LINE CONNECTORS FOR COMPUTER DEVICES UTILIZING RADIO AND MODEM CARDS

CROSS REFERENCE TO RELATED APPLICATIONS (CLAIMING BENEFIT UNDER 35 U.S.C. 120)

This application is a continuation-in-part of U.S. application Ser. No. 08/181,564 filed Jan. 13, 1994 by P. Kinney et al., now abandoned, which is in turn a continuation-in-part of U.S. application Ser. No. 08/154,020 filed Nov. 17, 1993 by P. Kinney et al., now abandoned, which is in turn a continuation-in-part of: U.S. application Ser. No. 08/107,470 filed Aug. 17, 1993 by P. Kinney and R. Mahany, now abandoned, which is in turn a continuation-in-part of U.S. application Ser. No. 08/081,411 filed Jun. 22, 1993 by P. Kinney, now abandoned, which is in turn a continuation-in-part of U.S. application Ser. No. 08/053,901 filed Apr. 27, 1993 by P. Kinney et al., now abandoned,; and U.S. application Ser. No. 08/097,462 filed Jul. 26, 1993 by G. West and R. Mahany now U.S. Pat. No. 5,590,346.

AUTHORIZATION PURSUANT TO 37 CFR 1.71 (d) (e)

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED CASE

The present case is related to U.S. application Ser. No. 08/114,872 filed Aug. 31, 1993 by S. Koenck, now U.S. Pat. No. 5,680,633, which is hereby incorporated by reference.

TECHNICAL FIELD

The present invention relates generally to computer devices utilizing removable radio frequency communication devices used for transmitting and receiving information and more particularly to an improved method and apparatus for connecting a communication card device such as a radio or modem to an appropriate antenna or telephone line and connecting a communication card device such as a radio or modem to a power source.

BACKGROUND ART

Many computer devices use modular components to allow increased flexibility and adaptability to various work environments. This is especially true in the area of small computing devices such as hand held computer terminals, vehicle mounted computer terminals and small lap-top computers. Along these lines, small, removable and interchangeable memory cards were developed. The memory cards have now become commonplace and the PCMCIA memory card standard has become accepted industry wide as the format to use.

The PCMCIA memory cards are relatively small having a length and width roughly the size of a credit card. The thickness of these cards is more than that of a credit card and there are several thicknesses used for different cards. These cards are designed to slide into a receiving portion of some computer device. At one end of the card is an interface section which is in essence the female portion of a connector that mates with the male end in the receiving device. All of this, including the number of pins, the layout of the pins, and the pin size for the connection, are all part of the PCMCIA standard.

The success of the removable and interchangeable PCMCIA memory cards has led to the development of other types of peripheral devices that use the same standard. Of particular interest to the present application are the cards that contain radio transceivers and modems. These devices can be inserted into and connected to a receiving device in the same manner as a memory card. However, with these devices there is an additional connection which must be made to connect a radio antenna, a telephone line, a cellular phone, or an antenna for the cellular phone.

Radio frequency communication allows two or more computer terminals to communicate without actually being wired together. Many types of radio communication exist and many different radio frequencies and frequency ranges can and must be used to accommodate the different types of radio communication. For example, a radio that operates by sending the information on a single channel in the UHF band differs greatly from a radio that sends its information utilizing spread spectrum frequency hopping in the 2400–2483 MHz range. The antennas necessary to operate in the different frequency ranges also differ. Similarly, modem communication, whether connected by traditional phone lines or by cellular phones, allow computer devices that are not hardwired together to exchange information.

Connection of the radio card or modem card to an outside antenna or telephone line is typically made by either extending the length of the card beyond the standard card length with the antenna or cable connector built into the extended portion or by having an antenna or telephone cable protrude out of the end of the radio card to which the user may attach an antenna or telephone line. These options have significant limitation. Both connections severely limit the type of device that can accommodate the cards. Most devices cannot accommodate the extra length without some modification and both connections make environmentally sealing the connections difficult. Additionally, both connections are susceptible to increased damage from dropping or other physical trauma An external antenna to which the user must couple an antenna is inconvenient and subjects the radio periods of unreliability due to wear of the cable and connection.

Another problem related to the use of radio cards and modem cards built in accordance with the PCMCIA standards is supplying the power required for these cards. Typically the power supply provided by the multi-pin interface is not sufficient.

Thus, there is a need in a computer terminal for an improved apparatus for connecting a removable card type radio or modem to an antenna or telephone line attached to or built within the computer terminal. Additionally, there is a need for an improved power supply connection capable of providing the power required by the radio and modem cards.

DISCLOSURE OF THE INVENTION

The present invention relates generally to computer devices utilizing removable radio frequency communication devices used for transmitting and receiving information and more particularly to an improved method and apparatus for connecting a communication card device such as a radio or modem to an appropriate antenna or telephone line and connecting a communication card device such as a radio or modem to a power source.

In one embodiment, a removable radio card can be inserted into a receiving device which is part of a computer terminal. The radio card has an electrical interface which engages with an interface on the receiving device. The interface on the receiving device is connected to the computer terminal and when the interfaces are engaged, communication between the radio card and the computer terminal is possible. Additionally, the receiving device is connected to at least one antenna by means of an antenna cable which has a pair of contacts located on the receiving device. This pair of receiving device antenna contacts encounter a pair of antenna contacts on the radio card. This connection allows the radio card to utilize an antenna located on or within the receiving device. Additionally, the connection of a modem card to a telephone, cellular phone, or antenna for a cellular phone can be accomplished in substantially the same manner.

In another embodiment of the present invention a radio card or modem card which is inserted into the computer terminal contains one set of contacts which encounter a corresponding set of contacts located on the receiving device. The receiving device contacts are connected to a switching matrix which is in turn connected to at least one of radio frequency antennas, a cellular phone, an antenna for cellular phone, or a jack for connection to a standard telephone line. As part of the regular communication with the radio card or modem card the computer terminal interrogates the radio card or modem card and determines to which antenna or telephone line the card should be connected.

Different radio cards may transmit on different frequencies and therefore need different antennas. Multiple antennas allow the radio cards to selectively transmit and receive on different antennas based upon the frequency used for communication. Additionally, two similar antennas can be used to implement an antenna diversity scheme.

Similar to the antenna contacts, power contacts are also positioned on the housing of the radio or modem card to provide needed supplemental power which cannot be provided for by the electrical interface.

An object of the present invention is to provide an improved antenna connector for use with radio cards which can be inserted into various computer devices.

Another object of the present invention is to provide an improved antenna connector which is reliable, economical and easy to use.

A further object of the present invention is to provide an improved antenna connector whereby an appropriate antenna will be connected to a radio card by selectively positioning the antenna contacts on the radio card.

Another object of the present invention is to provide an improved antenna connector whereby a radio card may simultaneously connect to and utilize more than one radio antenna.

Still another object of the present invention is to provide an improved apparatus for connecting a modem card to a telephone line, cellular telephone or antenna for a cellular phone.

A further object of the present invention is to provide an improved apparatus which utilizes only one set of contacts on the radio card or modem card and uses a switching matrix to connect the radio card or modem card to the appropriate antenna or telephone line.

Still another object of the present invention is to provide an improved apparatus for supplying power for radio and modem cards which utilize power contacts positioned on the side of the radio and modem cards.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a radio card and a corresponding port for receiving the radio card built in accordance with the present invention;

FIG. 2 is a partial top plan view of a radio card and port for receiving the radio card with the radio card completely inserted in the port;

FIG. 3 is a partial side elevational view taken along line 3—3 showing the male/female pin connection of the radio card and the port of FIG. 2;

FIG. 4 is a front view taken along line 4—4 showing the female pin connections of the radio card of FIG. 1;

FIG. 8 is a front view of another computer terminal and end cap capable of receiving a radio card;

FIG. 9 is a top view taken along line 9—9 of the computer terminal of FIG. 8;

FIG. 10 is a bottom view taken along line 10—10 of the computer terminal of FIG. 8 with the end cap removed;

FIG. 11 is a side elevation view taken along line 11—11 of the computer terminal of FIG. 8 with the slot for the radio card shown in dashed lines;

FIG. 12 is a partial top view taken along line 12—12 of the computer terminal of FIG. 11 showing the slot for receiving the radio card and the antennas;

BEST MODES FOR CARRYING OUT THE INVENTION

Figure 5:
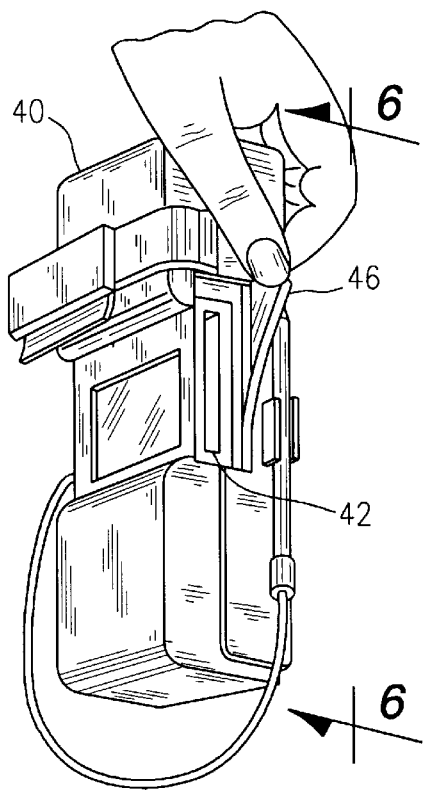
FIG. 5 is a perspective view of computer terminal showing the slot for receiving the radio card.

Referring now to the drawings wherein like reference numerals designate identical or corresponding parts throughout the several views, FIG. 1 shows a radio card (10) and a receiving device (11) built in accordance with the present invention. The radio card (10) has a housing (13) inside which is a completely operation radio transceiver (not shown). The receiving device (11) in this embodiment of the present invention uses a pair of opposed slots (14) to receive and guide the incoming radio card (10).

The radio card (10) has a pair of antenna contacts (15) positioned along the edge of the housing (13). The receiving device (11) has a corresponding pair of antenna contacts (16). As can be seen in FIG. 2, when the radio card (10) is inserted into the receiving device (11) the antenna contacts (15) on the radio card housing (13) electrically encounter the corresponding set of antenna contacts (16) positioned on the receiving device (11). The antenna contacts (16) on the receiving device (11) are connected to an antenna cable (18). The antenna cable (18) is in turn connected to an antenna (not shown). Thus, when the radio card (10) is completely inserted into the receiving device (11) the radio card (10) automatically is connected to an antenna.

Referring again to FIG. 1, a radio card (10) may have antenna contacts (20), shown in dashed lines, located at different positions on the housing (13). Similarly, the receiving device (11) may have several additional pairs of antenna contacts (22). The additional pairs of antenna contacts (22) on the receiving device (13) can be used to allow access to several different antennas depending on the type and frequency of radio communication to be utilized by the radio card (10). This access is accomplished through additional antenna cables (23) attached to the additional contacts (22). Thus, if the receiving device (13) is part of a hand held computer terminal which has more than one antenna attached or built in, different pairs of contacts (16 & 22) can be used to allow access by the radio card to the different antennas depending upon the frequency and range characteristics of each antenna. While a radio card (10) may only operate at one frequency and thereby only need one antenna and therefore only have one pair of antenna contacts, the receiving device (11) still may have several pairs of antenna contacts (16 &22) all but one of which do not correspond to any pair of radio card (10) antenna contacts (15).

Referring to FIGS. 3 and 4, when the radio card (10) is inserted into the receiving device (11) an interface between the radio card (10) and the receiving device (11) is produced. The receiving device (11) has a plurality of pins (30) which form the male portion of a connector. The radio card (10) has a corresponding plurality of holes (31) which form the female portion of the connector and which engage the pins (30). The pins (30) are connected to the computer terminal (not shown) by a series of electrical connections (33) such as wires or electrical ribbon. The holes (31) in the radio card (10) are electrically connected to the radio. When the pins (30) are engaged in the holes (31), electrical signals can be exchanged between the radio card (10) and the computer terminal. The electrical signals can be in the form of information exchange, power supply or both.

The radio card (10) of FIGS. 1–4 might also be a modem card (not shown). In this embodiment, the connections would be the same as previously described with the only difference being that instead of the contacts connecting the modem card to a radio antenna, the modem card would be connected to a traditional telephone line, a cellular phone or an antenna for a cellular phone if the cellular phone was built within the modem card.

Figure 6:
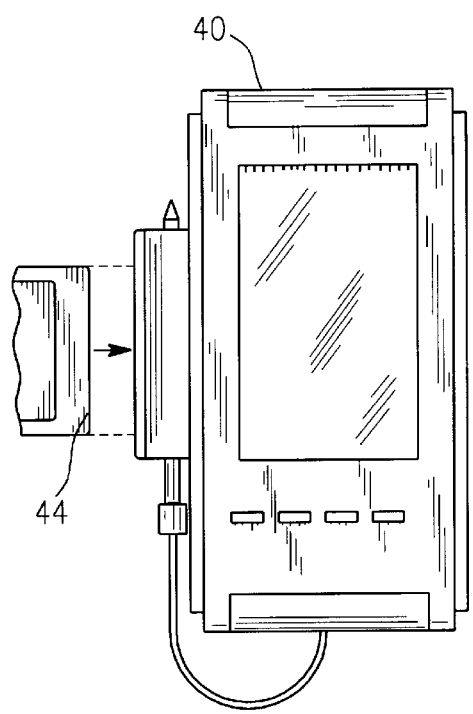
FIG. 6 is front view taken along line 6—6 showing how a radio card to be inserted into the slot of the computer terminal of FIG. 5.

Referring to FIGS. 5 and 6, a computer terminal (40) is shown built in accordance with the present invention. The computer terminal (40) has a slot (42) for receiving a radio card (44). The user of the computer terminal (40) lifts up a flexible cover (46) and inserts the radio card (44) into the slot (42). The radio card (44) engages with the computer terminal (40) in a similar manner as described in FIGS. 1–4.

The radio card (44) as a pair of antenna contacts (48) which will engage with a corresponding pair of contacts inside the computer terminal (40). The pair of antenna contacts inside the computer terminal are connected to a radio antenna (not shown).

Figure 7:
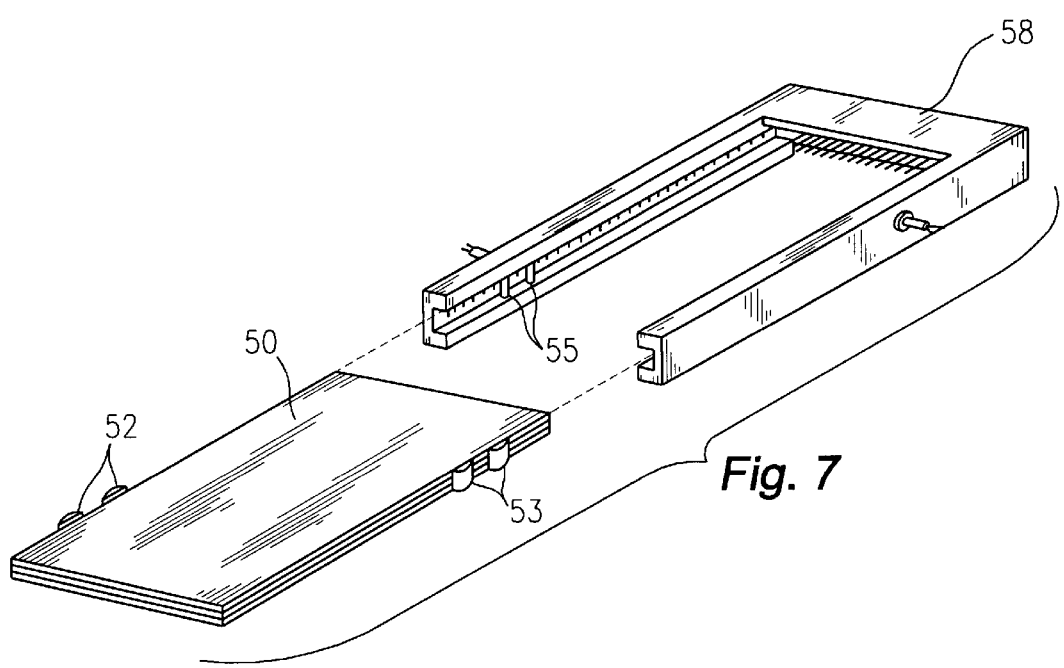
FIG. 7 is a perspective view of another radio card and a corresponding port for receiving the radio card built in accordance with the present invention.

Referring to FIG. 7, another embodiment of the present invention is shown. The radio card (50) has two pairs of antenna contacts (52 & 53) which will encounter respectively two pair of antenna contacts (55 & not shown) on the receiving device (58). This embodiment accommodates a radio card (50) which can operate at two different frequencies which require two different antennas. Standardization of antenna contact position with antenna type is anticipated and covered by the present invention.

Referring to FIGS. 8–12, another embodiment of a computer terminal (60) built in accordance with the present invention is shown. The computer terminal (60) has a removable end cap (62). When the end cap (62) is removed, a slot (60) is revealed which is used to receive a radio card (66). The slot (64) in the computer terminal (60) has three pairs of antenna contacts (67, 68 and 69) which are respectively connected to three different radio antennas (71, 72 and 73). The radio card (66) in this embodiment only has one pair of antenna contacts (75). Thus, when the radio card (66) is inserted into the slot (64), the antenna contacts (75) will match up to the antenna contacts (67) and the radio will utilize the internal antenna (71). The external antenna (73) and the other internal antenna (72) will not be used by this particular radio card (66).

Figure 13:
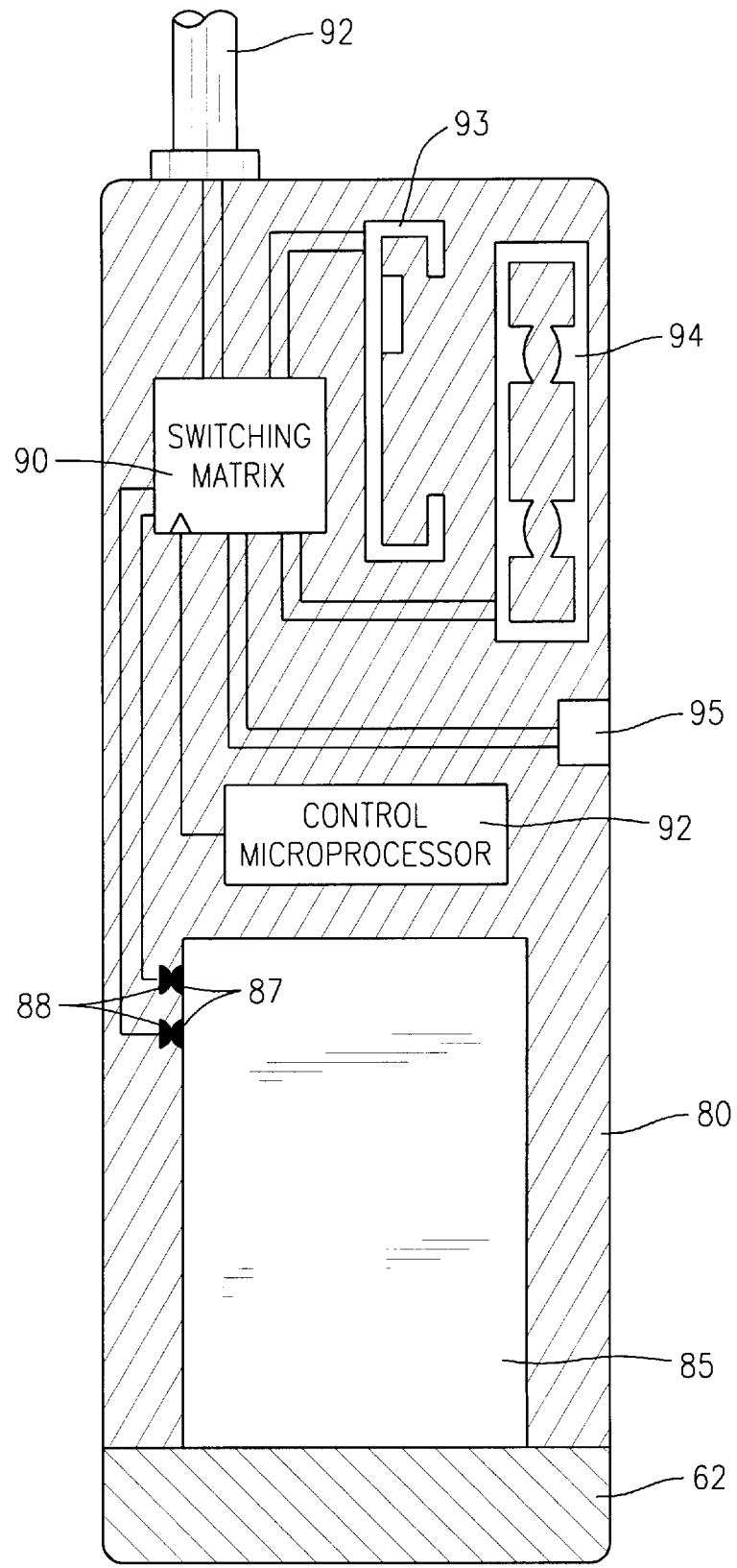
FIG. 13 is a partial top view of yet another embodiment of a computer terminal built in accordance with the present invention showing the use of a switching matrix.

Referring now to FIG. 13, still another embodiment of a computer terminal (80) built in accordance with the present invention is shown. A communication card (85) is inserted into the computer terminal (80). The card (85) can either be a radio card or a modem card. The card (85) has a set or pair of contacts (87) which encounter a set or pair of contacts (88) disposed on the receiving portion of the computer terminal (80). The contacts (88) are electrically connected to a switching matrix (90), thus the radio card or modem card (85) is electrically connected to the switching matrix (90).

The switching matrix (90) is connected to a plurality of antennas (92, 93 and 94) and to a telephone jack (95). The switching matrix (90) is used to electrically and selectively connect the radio or modem card (85) to the appropriate antenna or to a telephone line. The switching matrix (90) is controlled by the control microprocessor (98) of the computer terminal (80). The control microprocessor interrogates the card (85) to determine what kind of card it is and to determine what antenna or telephone connection it needs. The control microprocessor then signals the switching matrix (90) which connects the card (85) to the appropriate antenna (92, 93 or 94) or to the phone jack (95).

It should be noted that the design of a switching matrix which is to accommodate both RF and telephone connections must taken into account the different voltage requirements for each type of communication. For example, the Sony CXG1002 switch discussed below cannot handle the range of voltages necessary for compliance with telephone standards.

Figures 16, 17:
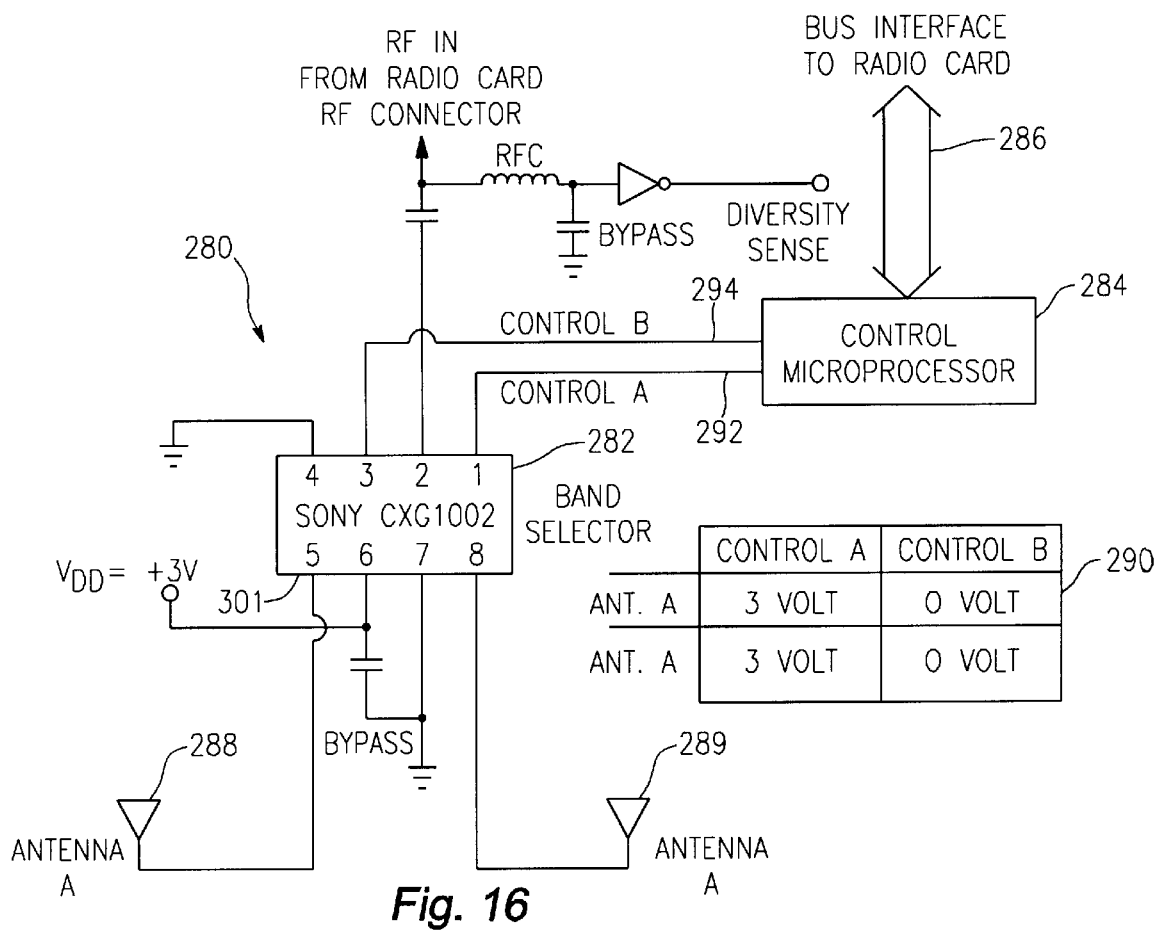
FIG. 16 is a circuit diagram of a switching matrix for microprocessor control of antenna selection.
FIG. 17 is a circuit diagram showing an antenna diversity scheme which can be incorporated into the switching matrix circuit of FIG. 16.

Referring now to FIG. 16, a circuit diagram (280) for antenna switching matrix is shown. The circuit (280) allows a radio card to be connected to one of two or more internal or connected antennas of a portable computer device. The circuit shown allows antennas (305 and 306) for one of two frequency bands to be selected. The design can be extended to allow additional bands to be added by appropriate selection of a switching device.

The illustrated circuit is based upon a Sony CXG1002 GaAs JFET switch (282). Switching is initiated by the control microprocessor (284) within the computer device. This microprocessor (284) may be a dedicated communications or control microprocessor, or it may be the main processor that runs local applications.

Upon initial power up of the computer device, the control microprocessor (284) interrogates the radio card via the bus interface (286) to ascertain its type and frequency band of operation. Based upon the result of the interrogation, the microprocessor (284) selects the appropriate logic levels from a logic level table (290) for application to the Control A line (292) and Control B line (294) to the CXG1002 switch (282) in order to select the proper antenna for the radio card. For example, if the computer device is designed to accommodate 900 MHz paging receivers and 2.4 GHz wireless local area network transceivers, antenna A (288) would be a 900 MHz antenna and antenna B (289) would be a 2.4 GHz antenna.

An optional diversity sense circuit is also shown. This circuit allows the radio card to provide a diversity select signal through the RF connector. The coil (298) is an RF choke, allowing low frequency signals to pass, but blocking RF signals.

Referring now to FIG. 17, a second circuit (300) illustrating how the diversity select circuit is implemented is shown. The B antenna output (301) from the band selector is applied to a second CXG1002 switch (320). Two antennas (305 and 306) appropriate for 2.4 GHz are designed into the computer device. These antennas (305 and 306) provide either spatial or polarization diversity, or a combination of the two.

Selection of the antenna used is controlled by the radio card. The diversity sense line (308) is used to control the CXG1002 switch (302). The invertor (310) provides buffering and allow a single signal output from the radio card to be used for antenna selection. Alternatively, the diversity sense could be provided to the control microprocessor which could then in turn control the selection of antennas.

Selection diversity could be employed in both the A and B antenna paths if desired with the addition of a CXG1002 switch in the A path. This switch could be controlled by the same circuitry as the B switch, eliminating the need for separate control circuitry for the A path.

Figure 14:
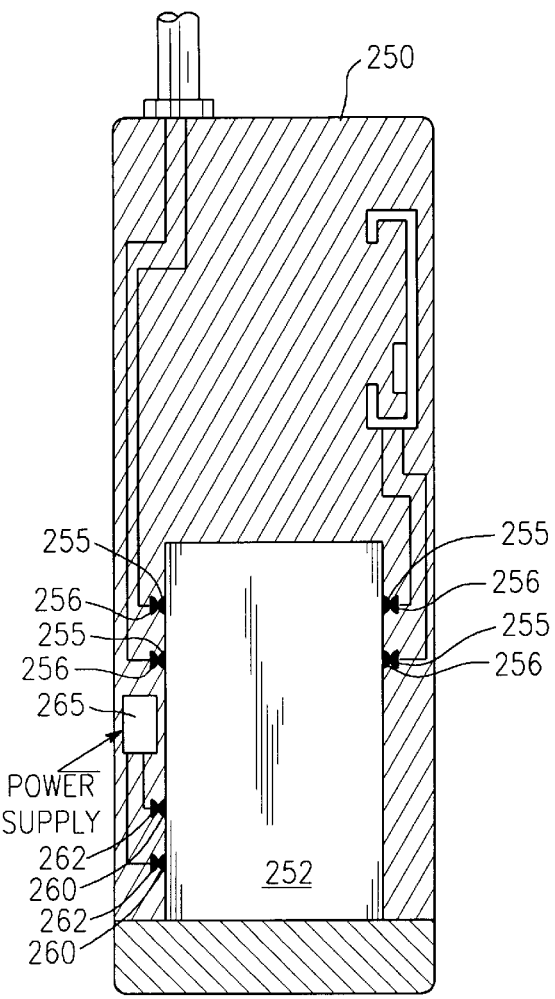
FIG. 14 is a partial top view of a computer device built in accordance with the present invention showing a pair of power contacts.

Referring now to FIG. 14, a radio card or modem card (252) is shown inserted into a computer device (250). In addition to antenna contacts or telephone line contacts (255) on the card (252) and corresponding antenna, modem or telephone contacts (256) disposed on the receiving portion of the computer device (250), there are a pair of power contacts (260) positioned on the housing of the card (252) which engage a corresponding pair of power contacts (262) disposed on the receiving portion of the computer device (250). The power contacts (262) are connected by wires to the power supply (265) for the computer device (250) and provides supplemental power to the radio, modem or cellular phone inside the card (252) which cannot be provided by the electrical interface.

Figure 15:
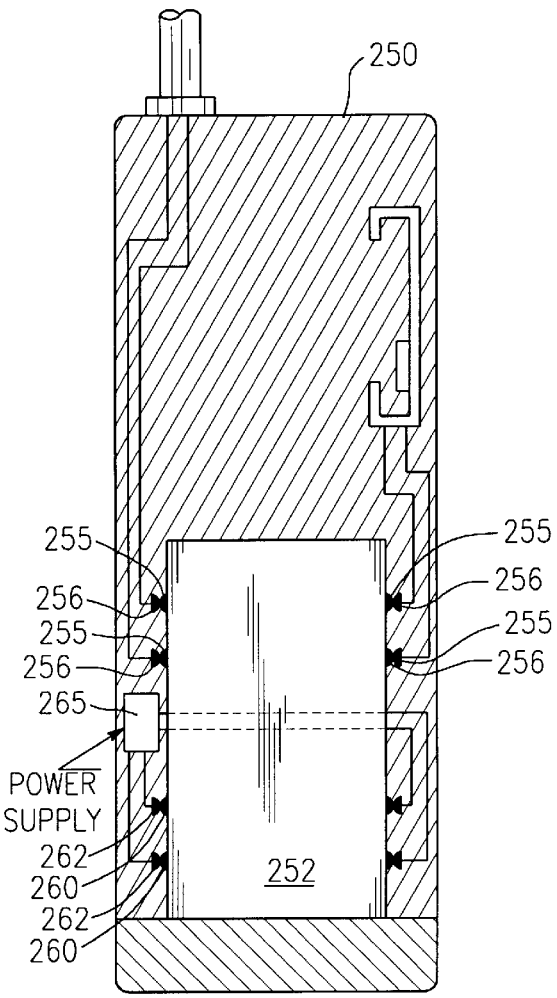
FIG. 15 is a partial top view of another computer device built in accordance with the present invention showing redundant power contacts.

Referring now to FIG. 15, the card (252) is shown with an additional pair of power contacts (270) positioned on the opposite side of the card (252) with respect to the first pair of power contacts (260). The additional pair of power contacts (270) engage a corresponding pair of power contacts (272). The power contacts (272) are also connected by wires to the power supply (265). The second pair of engaging contacts (270 & 272) provide power source redundancy and insures that the card (252) will be connected to the power supply (265) even if the card (252) shifts slightly from side to side in the receiving portion of the computer device (250). This redundancy of contacts positioned on opposite sides of the housing of a communication card could also be used to insure that the communication card is always in contact with an appropriate antenna or telephone.

Obviously, many modifications and variations of the present invention are possible in light of the above teachings. It is therefore to be understood that, within the scope of the appended claims, the invention may be practiced otherwise than as specifically described.

We claim:

1. A radio frequency communication apparatus comprising:
   a radio card, said radio card including a first housing, a radio disposed within said first housing, a first plurality of radio antenna contacts positioned on a first surface of said first housing and electrically connected to said radio, and a first electrical interface, electrically and physically independent of said first plurality of antenna contacts, coupled to said radio an d positioned on a second surface of said first housing;
   a second housing having a slot for receiving said radio card;
   a second electrical interface disposed within said second housing to matingly engage said first electrical interface of said radio card upon insertion of said radio card into the slot of said second housing;
   a second plurality of antenna contacts disposed within said second housing to matingly engage at least one of said first plurality of antenna contacts of said radio card simultaneously with the mating engagement of said second electrical interface with said first electrical interface upon insertion of said radio card into the slot of said second housing, such second plurality of antenna contacts electrically and physically independent of said second electrical interface; and
   at least one antenna electrically coupled to said second plurality of antenna contacts.

2. The radio frequency communication apparatus of claim 1 further comprising:
   a power source disposed within the second housing;
   a first plurality of battery power contacts disposed on said first housing of said radio card, said first plurality of battery power contacts electrically and physically independent of said first electrical interface; and
   a second plurality of battery power contacts disposed on said second housing to matingly engage said first plurality of battery power contacts simultaneously with the mating engagement of said second electrical interface with said first electrical interface upon insertion of said radio card into the slot of said second housing, said second plurality of battery power contacts electrically and physically independent of said second electrical interface.

3. The radio frequency communication apparatus of claim 1 wherein said at least one antenna comprises a plurality of antennas.

4. The radio frequency communication apparatus of claim 3 wherein each of said plurality of antennas operate over a separate frequency range.

5. The radio frequency communication apparatus of claim 3 wherein each of said plurality of antennas provides different operating performance.

6. The radio frequency communication apparatus of claim 5 wherein said plurality of antennas are available for antenna diversity selection.

7. The radio frequency communication apparatus of claim 1 further comprising a switching unit and a controller coupled to said switching unit, and wherein said controller controls said switching unit to selectively couple said at least one antenna to said second plurality of antenna contacts.

8. The radio frequency communication apparatus of claim 7 wherein the selective coupling performed by said controller involves considerations of antenna diversity.

9. The radio frequency communication apparatus of claim 1 wherein ones of said first plurality of antenna contacts matingly engage only corresponding ones of said second plurality of antenna contacts upon insertion of said radio card into the slot of said second housing.

10. The radio frequency communication apparatus of claim 9 wherein said at least one antenna comprises a plurality of antennas, and said first plurality of antenna contacts are selectively positioned on said radio card to select one of said plurality of antennas coupled to ones of said second plurality of antenna contacts.

* * * * *